HIGH SPEED PULSE DETECTOR

Filed Dec. 7, 1960

INVENTORS.
FRANK L. CAMPANOZZI
FRANK NIERTIT
BY Robert L. Nathans
ATTORNEY

United States Patent Office 3,131,355

Patented Apr. 28, 1964

3,131,355

HIGH SPEED PULSE DETECTOR

Frank L. Campanozzi and Frank Niertit, Rochester, N.Y., assignors to General Dynamics Corporation, Rochester, N.Y., a corporation of Delaware Filed Dec. 7, 1960, Ser. No. 74,400
2 Claims. (Cl. 328—120)

The present invention relates to high speed pulse detectors which produce a first output signal upon the application of a pulse train to the detector and which produce a second output signal immediately upon the interruption of the pulse train.

In modern high speed electronic telephone switching circuits and in other systems such as data processing systems, it is often necessary to provide an indication of the presence or absence of a train of pulses. It is desirable to provide a first output signal upon the presence of a pulse train and a second output signal immediately upon the interruption of the train, which second output signal continues to be produced until the interruption ceases and the train reappears. In certain applications it is necessary to provide such indications where the frequency of the pulse train may be as high as 2 megacycles.

Accordingly, it is a principal object of the present invention to provide a new and improved high speed pulse detector.

It is a further object of the present invention to provide a new and improved high speed pulse detector which produces a first output signal as long as a train of pulses is applied to the detector and which produces a second output signal upon the interruption of said train and as long as said train remains interrupted.

Figure 1:
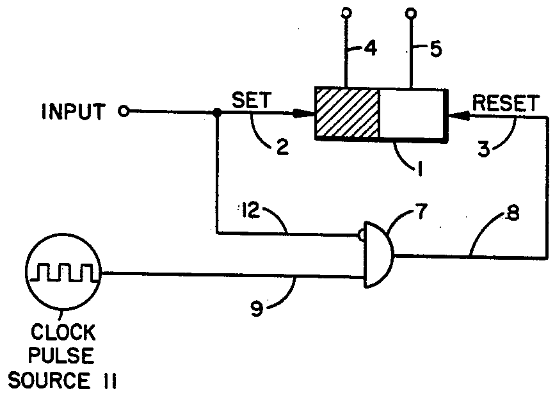
Figure 2:
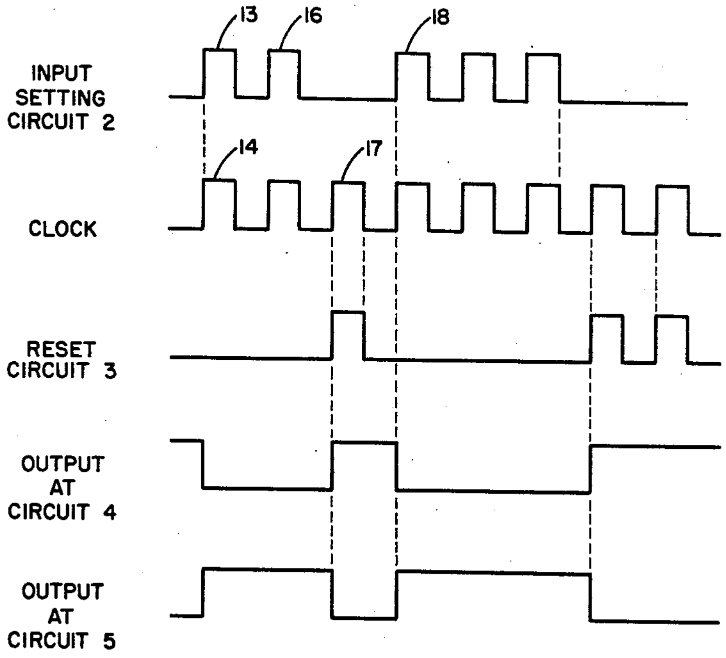

Further objects, features and the attending advantages of the present invention will become apparent with reference to the following specification and drawings in which:

FIG. 1 discloses a preferred embodiment of the present invention;

FIG. 2 discloses various pulse diagrams which will aid in the understanding of the embodiment disclosed in FIG. 1.

Referring now to FIG. 1 of the drawing, bistable element 1 which may be a high speed mesa transistor flip-flop is disclosed, having a setting circuit 2, a resetting circuit 3, an output circuit 4 and an output circuit 5. Inhibit gate 7 has an output circuit 8 connected to reset circuit 3 and has an input circuit 9 connected to clock pulse source 11 together with an input circuit 12 connected to setting circuit 2. Inhibit gate 7 disclosed in FIG. 1 will produce a mark on output circuit 2 when a mark is produced in input circuit 9 provided that no mark is present on input or inhibit circuit 12. If a mark is applied to inhibit circuit 12, no mark will be produced on output circuit 8 regardless of whether or not a mark is applied to input circuit 9.

The pulse detector of the present invention operates effectively where the input pulses to be detected when present will be synchronized with the pulses produced by clock pulse source 11. This situation often occurs in high speed electronic switching telephone circuits and data processing systems.

Reference should be made to the pulse diagrams of FIG. 2 in order to visualize more easily the operation of the circuitry of the present invention. The presence of pulse 13 at setting circuit 2 and at input circuit 12 of inhibit gate 7 cause bistable element 1 to be flipped thereby to cause the voltage at output circuit 4 to go negative. Clock pulse 14 is applied to input circuit 9 of inhibit gate 7 concurrently with the application of input pulse 13 to setting circuit 2. As a result, no mark is applied to resetting circuit 3 and the bistable element therefore remains set. When input pulse 16 is applied to setting circuit 2, again no mark is produced in the resetting circuit 3 of bistable element 1 so that the bistable element remains flipped and the voltage in output circuit 4 remains negative. When the input pulse train becomes interrupted as shown in FIG. 2, no mark is applied to inhibit circuit 12 so that clock pulse 17 will be able to pass through inhibit gate 7 thereby to produce a mark in output circuit 8 to reset bistable element 1. This condition will continue to prevail if no further input pulses are applied to setting circuit 2. When the interruption of the pulse train ceases, an input pulse 18 is applied to setting circuit 2 and the bistable element again is flipped as explained hereinabove.

Since the speed of operation of stanard mesa transistor flip-flops may attain 2 megacycles or more and since the response time of inhibit gate 7 is extremely small, it follows that the detector of the present invention may provide indications of the presence or absence of impulses in a pulse train where the frequency of said train is in the 1–2 megacycle range. An indication that a pulse is missing is given almost coincidentally with the leading edge of the clock pulse produced during the assigned time interval of the missing pulse. Accordingly, the response time of the detector is extremely brief. It should be understood that as bistable elements are developed in the future having higher speeds of operation it follows that the detector will be able to function at even greater frequencies.

It should also be understood that the present invention is in no way limited to the use of an inhibit gate. An inverter AND gate combination may be readily substituted, since it is the logical equivalent of the inhibit gate as is well known in the art.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. A high speed pulse detector comprising, bistable element having a first control circuit for causing said bistable element to assume a first state when a mark pulse is applied to said first control circuit, said bistable element having a second control circuit for causing said bistable element to assume a second state when a mark pulse is applied to said second control circuit, an output circuit for producing an output signal indicative of the state of said bistable element, means having a first and second input circuit and an output circuit for producing a mark pulse in said output circuit when a mark pulse is applied to said second input circuit and no mark pulse is applied to said first input circuit, a clock pulse source, means for connecting said clock pulse source to the second input circuit of said means for producing, means for coupling the first control circuit of said bistable element to the first input circuit of said means for producing, means for coupling the output circuit of said means for producing to the second control circuit of said bistable element, means for randomly generating mark pulses coincident in time with at least some of the mark pulses produced by said clock pulse source, and means for coupling said means for randomly generating mark pulses to said first control circuit.

2. The combination as set forth in claim 1 wherein said means for producing comprises an inhibit gate.

References Cited in the file of this patent

UNITED STATES PATENTS

| | | |
|---|---|---|
| 2,851,219 | Hussey | Sept. 19, 1958 |
| 2,880,317 | Vaughan | Mar. 31, 1959 |
| 2,903,605 | Barney et al. | Sept. 8, 1959 |